Feb. 20, 1934.    J. C. McCUNE    1,947,727
DOOR CONTROL DEVICE
Filed July 31, 1930
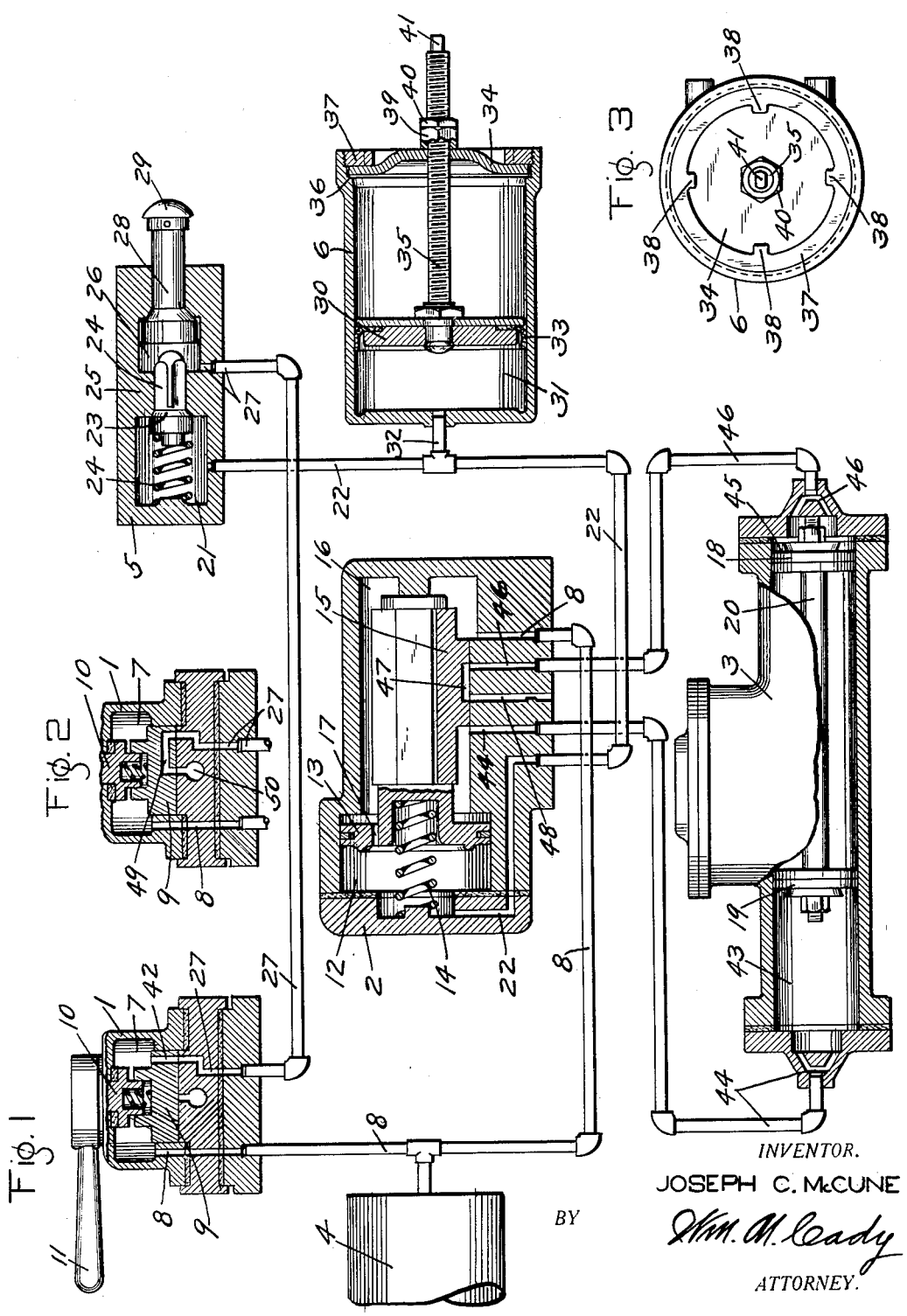
INVENTOR.
JOSEPH C. McCUNE
BY Wm. M. Cady
ATTORNEY.

Patented Feb. 20, 1934

1,947,727

UNITED STATES PATENT OFFICE 1,947,727

DOOR CONTROL DEVICE

Joseph C. McCune, Edgewood, Pa., assignor to The Westinghouse Air Brake Company, Wilmerding, Pa., a corporation of Pennsylvania Application July 31, 1930. Serial No. 471,968

14 Claims. (Cl. 268—50)

This invention relates to fluid pressure equipments and more particularly to such equipments for use in controlling the operation of the door or doors of a vehicle.

The principal object of my invention is to provide a variable volume fluid pressure reservoir for use in fluid pressure equipments and another feature resides in the means for varying the volume of the reservoir.

Another object of my invention is to provide a vehicle door controlling equipment which is controlled by both the operator and a passenger for opening a door of the vehicle and which is normally controlled automatically for closing the door, and a further object is to provide means for controlling the automatic operation of the equipment so as to effect the closing of the door when the door has been open for a predetermined period of time.

Other objects and advantages of the invention will appear in the following more detailed description.

In the accompanying drawing; Figure 1 is a diagrammatic view, mainly in section, of a fluid pressure door controlling equipment embodying my invention, the equipment being shown in door closed position; Fig. 2 is a fragmentary sectional view of the door control valve device in door opening position; and Fig. 3 an elevational view of the volume control reservoir of the equipment.

As shown in the drawing, my improved door controlling equipment may comprise an operator's door valve device 1, a relay valve device 2, a door engine 3, a fluid pressure supply source such as a main reservoir 4, a passenger's door opening valve device 5 and a reservoir 6, the effective volume of which reservoir 6 is variable.

The operator's valve device 1 may comprise a casing having a chamber 7 which is constantly connected to the main reservoir 4 through a passage and pipe 8 and contains a rotary valve 9 having a stem 10 on which an operating handle 11 is mounted.

The relay valve device 2 may comprise a casing having a chamber 12 containing a piston 13 which is subject to the pressure of a spring 14 also contained in the chamber 13, which piston is adapted to operate a slide valve 15 contained in a chamber 16 which is constantly connected to the main reservoir pipe 8. The chambers 12 and 16 are constantly connected to each other through a passage 17 of small diameter which is provided in the piston 13.

The door engine 3 may comprise a casing containing door opening and door closing pistons 18 and 19 respectively, which are spaced apart and are connected together by a bar 20 which is adapted to actuate the remainder of the usual door operating mechanism (not shown).

The passenger's valve device 5 may comprise a casing having a chamber 21, which is constantly connected to the piston chamber 12 in the relay valve device 2 through a passage and pipe 22 and contains a vent valve 23, which is subject to the pressure of a spring 24 also contained in the chamber 21. The valve 23 has a fluted stem 24 which extends through an opening formed in a wall 25 of the casing and into a chamber 26, which is connected to the seat of the rotary valve 9 of the valve device 2 through a pipe and passage 27. Within the chamber 26 the end of the fluted stem is adapted to be operatively engaged by the inner end of a plunger 28 which is slidably mounted in the casing and which at its outer end is provided with a push button 29.

This valve device 5 is secured to the body of the vehicle in such a position that it is easily accessible to a passenger desiring to leave the vehicle.

The reservoir 6 may comprise a cylindrical casing containing a wall member 30 which is movable relative to the casing to vary the volume of the chamber 31 which is constantly connected through a branch pipe 32 to the pipe 22 at a point intermediate the piston chamber 12 in the relay valve device 2 and the valve chamber 21 in the passenger's door opening valve device 5. The wall 30 is preferably provided with a packing ring 33 which engages the interior surface of the casing to provide a leak proof seal preventing fluid under pressure in the chamber 31 from leaking to the opposite side of the wall member.

For the purpose of varying the position of the wall member 30 in the casing, any suitable adjusting means may be employed. In the drawing one form of adjusting means has been shown which comprises cooperating screw-threaded members 34 and 35. The member 34 is rotatably mounted in the open end of the reservoir casing and is held against movement in one direction longitudinally of the casing by an annular shoulder 36 formed integral with the casing and in the opposite direction by a ring 37 having screw-threaded connection with the casing, the ring being provided with lugs 38 for engagement of a suitable tool in applying or removing the ring from the casing. This member 34 is provided with an exterior hexagonal portion 39 through the medium of which the member is adapted to be rotated by a wrench or other suitable tool.

The member 35 is disposed longitudinally of the casing and passes through the member 34, the screw-threads on both of the members cooperating with each other. The inner end of this member 35 is rigidly secured to the wall member 30 and the outer end is flattened as indicated by the reference character 41 which is adapted to be engaged by a suitable tool for holding the member against rotation when the member 34 is rotated.

For the purpose of holding the member 34 against accidental rotation, a lock nut 40 is turned on the outer end portion of the member 35 and into locking engagement with the end of the hexagonal portion 39 of the member 34.

Assuming the operator's door controlling valve device to be in door closing position as shown in Fig. 1 of the drawing, fluid under pressure supplied from the reservoir 4 flows to the rotary valve chamber 7 in this valve device through pipe and passage 8 and from thence to the chamber 26 in the passenger's valve device 5 through a port 42 in rotary valve 9 and passage and pipe 27.

The pressure of fluid thus supplied to the chamber 26 in the valve device 5, causes the valve 23 to unseat against the opposing pressure of the spring 24 so that fluid under pressure flows from the chamber 26 to the valve chamber 21 and from thence to the piston chamber 12 in the relay valve device 2 through pipe and passage 22. From the pipe 22 fluid under pressure flows to the reservoir chamber 31 through the branch pipe 32.

From the reservoir 4 fluid under pressure is also supplied to the valve chamber 16 in the relay valve device 2 through pipe and passage 8.

Fluid under pressure will be supplied to the piston chamber 12 in the relay valve device 2 at substantially the same rate as it is supplied to the valve chamber 16 so that the pressure of the spring 14 will maintain the piston 13 and slide valve 15 in their right hand or door closing positions in which fluid under pressure is supplied to a piston chamber 43 at one side of the door closing piston 19 of the door engine through a door closing passage and pipe 44, and a chamber 45 at one side of the door opening piston is connected to the atmosphere through a door opening passage and pipe 46, a cavity 47 in the slide valve 15 of the relay valve device and a restricted passage 48. The pressure of fluid in the chamber 43 acting on the piston 19 maintains the door closed.

With the equipment thus fully charged and the door closed, the pressures in the chambers 21 and 26 of the passenger's valve device will be substantially equal and the pressure of the spring 24 will seat the valve 23 and maintain it seated.

When the vehicle is brought to a stop, the operator, by use of the operating handle 11, rotates the rotary valve 9 of the valve device 1 to door open position in which the chamber 26 of the passenger's valve device 5 is connected to the atmosphere through passage and pipe 27, a cavity 49 in the rotary valve 9 and a passage 50.

Now if a passenger desiring to leave the car, pushes the button 29 of the passenger's valve device 5 inwardly, the valve 23 is unseated against the pressure of the spring 24 and with the valve 23 thus unseated, fluid under pressure is vented from the piston chamber 12 in the relay valve device to the atmosphere through passage and pipe 22, valve chamber 21 in the passenger's valve device 5, past the unseated valve 23 and its fluted stem 24, through chamber 26, passage and pipe 27, cavity 49 in the rotary valve 9 of the valve device 1 and passage 50. Since the chamber 31 is constantly connected to the pipe 22 through the branch pipe 32, fluid under pressure in this chamber will also be vented to the atmosphere by way of pipe 22.

Upon the discharge of fluid under pressure from the piston chamber 12, the pressure of fluid in the valve chamber 16 causes the relay piston 13 to operate to its left hand position against the pressure of the spring 14, shifting the slide valve 15 to its door opening position in which, fluid under pressure in the door engine 3 is vented to the atmosphere through the door opening passages and pipe 44, cavity 47 in the slide valve 15 and restricted passage 48. With the slide valve in door opening position, the passage 46 is uncovered and fluid under pressure from the valve chamber 16 flows to the door opening piston chamber 45 through said passage and pipe 46, causing the door engine to operate to open the door.

Since the piston chamber 12 and the valve chamber 16 in the relay valve device 2 are constantly connected through a passage 17 in the piston 13, fluid under pressure in the chamber 16 will flow to the chamber 12, but the passage 17 is of such diameter that the venting of fluid from the chamber 12 is at a much faster rate than it is supplied to the chamber, so that as long as the valve devices 1 and 5 are in door opening positions, the piston 13 and consequently the slide valve 15 carried thereby will be maintained in their door opening positions against the pressure of the spring 14 by the pressure of fluid in the valve chamber 16.

When the button 29 is relieved of pressure by the passenger, the pressure of the spring 24 of the valve device seats the valve 25 and closes the atmospheric communication from the piston chamber 12 of the relay valve device and chamber 31 in the reservoir 6. With the valve 23 thus seated, fluid under pressure supplied to the relay piston chamber 12 from the valve chamber 16 through the passage 17 flows to the valve chamber 21 in the valve device 5 through passage and pipe 22 and from the pipe 22 also flows through the branch pipe 32 to the chamber 31 in the reservoir 6. Now when the pressure of fluid in the relay piston chamber 12 and piston chamber 16 are substantially equal, the pressure of the spring 14 causes the relay piston 13 to move to its extreme right hand or door opening position in which, fluid under pressure is vented from the piston chamber 45 in the door engine through passages and pipe 46, cavity 47 in the relay slide valve 15 and restricted passage 48, and fluid under pressure is supplied from the valve chamber 16 in the relay valve device to the piston chamber 43 in the door engine through passages and pipe 44, causing the door engine to operate to close the door.

It will thus be seen that with the operator's door controlling valve device in door open position and the valve 23 of the passenger's valve device 5 seated, the equipment will operate automatically to close the door at a predetermined time after the passenger has released the button 29, the interval of time elapsing between the opening and closing of the door being sufficient to permit the passenger to leave the car.

If, for any reason, it is desired to vary the lapse of time between the opening and closing of the door, the position of the wall member 30 is adjusted. To do this the lock nut is first turned on the member 35 out of engagement with the portion 39 of the rotatable member 34, then with the screw-threaded member 35 held by means of a suitable tool applied to the outer end portion 41, against rotation, the member 34 is rotated in a clockwise or counter-clockwise direction, according to the adjustment desired, through the medium of a suitable tool applied to the portion 39. Due to the cooperation of the members 34 and 35, the rotation of the member 34 causes the member 35 and wall member 30 to be moved back or forth according to the direction of rotation of the member 34, thus varying the volume of the chamber 31. If the member 34 is rotated in a clockwise direction, the wall member 30 will be shifted in a direction toward the right hand, thus increasing the size of the chamber 31 and if rotated in a counter-clockwise direction the member 30 will be shifted in a direction toward the left hand, thus decreasing the size of the chamber 31. Since the relay piston chamber 12 and the reservoir chamber 31 are constantly connected, the time at which the pressure of fluid in the relay piston chamber 12 is sufficient to permit the pressure of the spring 14 to shift the relay piston and slide valve to their extreme right hand or door closing position will vary according to the adjusted volume of the reservoir.

If, when the passenger has left the vehicle, it is desired to close the door quickly, the operator, by the use of the handle 11 of the valve device 1, moves the rotary valve 9 to door closed position as shown in Fig. 1, in which position, fluid under pressure is again supplied to the chamber 26 in the passenger's valve device 5, causing the valve 23 to unseat against the pressure of the spring 24. Fluid under pressure supplied to the chamber 26 now flows at an unrestricted rate to the relay valve chamber 12 and reservoir 31 with the consequence that the pressure in the chamber 12 will be quickly restored and the relay valve device will operate to effect the door closing operation of the door engine 3.

The reason for restricting the passage 48 in the relay valve device 2 is to restrict the rate of the exhaust flow of fluid under pressure from the door engine piston chambers 43 and 35 to prevent the door from being opened or closed too quickly.

In the present embodiment of my invention, the reservoir 6 has been shown and described in connection with a vehicle door controlling equipment for determining the time at which the vehicle door will be automatically closed, but it is to be understood that I do not wish to be limited to this for I contemplate the use of this reservoir in other fluid pressure equipments in which it is desired to vary the volume of a fluid pressure reservoir or chamber.

While one illustrative embodiment of the invention has been described in detail, it is not my intention to limit its scope to that embodiment or otherwise than by the terms of the appended claims.

Having now described my invention, what I claim as new and desire to secure by Letters Patent is:

1. In a vehicle door controlling means, the combination with a door engine for controlling the opening and closing of the vehicle door, of valve means operative upon a reduction in fluid pressure for controlling the operation of said door engine to open the door and operative upon the restoration of fluid under pressure for controlling the operation of said door engine to close the door, and means for retarding the restoration of the pressure of fluid in said valve means to time the operation of the valve means from door opening position to door closing position.

2. In a vehicle door controlling means, the combination with a door engine for controlling the opening and closing of the vehicle door, of valve means operative upon a reduction in fluid pressure for controlling the operation of said door engine to open the door and operative upon the restoration of fluid under pressure for controlling the operation of said door engine to close the door, and means for retarding the restoration of the pressure of fluid in said valve means to delay the operation of the valve means from door open position to door closing positon for a predetermined period of time, said means being adjustable to vary the length of said predetermined period of time.

3. In a vehicle door controlling means, the combination with a door engine for controlling the opening and closing of the vehicle door, of valve means operative upon a reduction in fluid pressure for controlling the operation of said door engine to open the door and operative upon the restoration of fluid under pressure for controlling the operation of said door engine to close the door, and means for retarding the restoration of the pressure of fluid in said valve means for restoring fluid under pressure to said valve means at a fixed slow rate, and means for retarding the increase in the pressure of fluid restored at said fixed rate for delaying the operation of the valve means to door closing position for a predetermined period of time.

4. In a vehicle door controlling means, the combination with a door engine for controlling the opening and closing of the vehicle door, of valve means operative upon a reduction in fluid pressure for controlling the operation of said door engine to open the door and operative upon the restoration of fluid under pressure for controlling the operation of said door engine to close the door, and means for restoring fluid under pressure to said valve means at a fixed slow rate, and means for retarding the increase in the pressure of fluid restored at said fixed rate for delaying the operation of the valve means to door closing position for a predetermined period of time, the last mentioned means comprising a fluid pressure chamber, the volume of which is variable for varying the length of said period of time.

5. In a vehicle door controlling means, the combination with a door engine for controlling the opening and closing of the vehicle door, of valve means operative upon a reduction in fluid pressure for controlling the operation of said door engine to open the door and operative upon the restoration of fluid under pressure for controlling the operation of said door engine to close the door, and means for restoring fluid under pressure to said valve means at a fixed slow rate, means for retarding the increase in the pressure of fluid restored at said fixed rate for delaying the operation of the valve means to door closing position for a predetermined period of time, the last mentioned means comprising a fluid pressure chamber, a member for varying the volume of said chamber to vary the length of said period of time, and means for adjusting the position of said member.

6. In a vehicle door controlling means, the combination with a door engine for opening and closing the vehicle door, of two manually operative valve devices the combined operation of which is required for controlling the operation of said door engine to open the door, and means operative automatically for controlling the operation of said door engine to start to close the door at a predetermined time after one of said valve devices has been released.

7. In a vehicle door controlling means, the combination with a door engine for opening and closing the vehicle door, of fluid pressure operated valve means under the combined control of an operator and a passenger for controlling the operation of said door engine to open the door and operative automatically for controlling the operation of said door engine to start to close the door at a predetermined time after the passenger relinquishes control of said fluid pressure operated valve means.

8. In a vehicle door controlling means, the combination with a door engine for opening and closing the vehicle door, of means under the combined control of an operator and a passenger for controlling the operation of said door engine to open the door and operative automatically for controlling the operation of said door engine to start to close the door at a predetermined time after the passenger's control is relinquished, and means for varying the length of time said means remains in door open position after the passenger's control is relinquished.

9. In a vehicle door controlling means, the combination with a door engine for opening and closing the vehicle door, of fluid pressure operated valve means under the control of both an operator and a passenger for controlling the operation of said door engine to open the door and operative automatically for controlling the operation of said door engine to close the door after the passenger has relinquished the control of said valve means and the door has been open for a predetermined period of time, and under the control of the operator for controlling the operation of said door engine to close the door before the lapse of said period of time.

10. In a vehicle door controlling equipment, the combination with a door engine subject to variations in fluid pressures for controlling the door, of valve means operative upon a reduction in fluid pressure for varying the pressures of fluid in said door engine to cause said engine to operate to open the door and operative upon an increase in fluid pressure for varying the pressures of fluid in said door engine to cause said engine to operate to close the door, an operator's valve device and a passenger's valve device being operative to establish communication through which the pressure of fluid in said valve means is reduced, said passenger's valve device being operative upon release by a passenger to close said communication, means for increasing the pressure of fluid in said valve means at a fixed slow rate when said passenger's valve device is closed, and means for retarding the increase in the pressure of fluid supplied at said fixed rate.

11. In a vehicle door controlling equipment, the combination with a door engine subject to variations in fluid pressures for controlling the door, of valve means operative upon a reduction in fluid pressure for varying the pressures of fluid in said door engine to cause said engine to operate to open the door and operative upon an increase in fluid pressure for varying the pressures of fluid in said door engine to cause said engine to operate to close the door, an operator's valve device and a passenger's valve device being operative to establish communication through which the pressure of fluid in said valve means is reduced, said passenger's valve device being operative upon release by a passenger to close said communication, means for increasing the pressure of fluid in said valve means at a fixed slow rate when said passenger's valve device is closed, and means for retarding the increase in the pressure of fluid supplied at said fixed rate, said operator's valve device having a door closing position in which fluid under pressure is adapted to be supplied to said valve means at a fast rate.

12. In a vehicle door controlling equipment, the combination with a fluid pressure controlled door engine for controlling the opening and closing of the vehicle door, a door opening pipe connected to said door engine, a door closing pipe connected to said door engine, a fluid pressure controlled valve device having a door closing position in which the door opening pipe is vented and in which fluid under pressure is admitted to the door closing pipe and having a door opening position in which the door closing pipe is vented and in which fluid under pressure is admitted to the door opening pipe, an operator's valve and a passenger's valve both of which must be operated to door opening position to control the operation of said valve device to door opening position, and means for automatically controlling the operation of said valve device to door closing position at a predetermined time after said passenger's valve device is released.

13. In a vehicle door controlling equipment, the combination with a fluid pressure controlled door engine for controlling the opening and closing of the vehicle door, a door opening pipe connected to said door engine, a door closing pipe connected to said door engine, a fluid pressure controlled valve device having a door closing position in which the door opening pipe is vented and in which fluid under pressure is admitted to the door closing pipe and having a door opening position in which the door closing pipe is vented and in which fluid under pressure is admitted to the door opening pipe, an operator's valve and a passenger's valve both of which must be operated to door opening position to control the operation of said valve device to door opening position, means for automatically controlling the operation of said valve device to door closing position, and means for restricting the flow of fluid from said door opening and door closing pipes.

14. In a vehicle door controlling equipment, the combination with a door engine operative by variations in fluid pressures for controlling the vehicle door, a valve having a door closing position in which the pressures of fluid in said door engine is varied to cause said engine to operate to close the door and having a door opening position in which the pressures of fluid in said door engine is varied to open the door, a piston subject to variations in fluid pressure for operating said valve, an operator's valve device and a passenger's valve device operative manually to vary the pressure of fluid on said piston for effecting the operation of the piston and thereby said valve to door opening position, and a passage in said piston through which fluid under pressure is supplied to vary the pressure of fluid on said piston for effecting the operation of the piston and thereby said valve to door closing position when the passenger releases the passenger's valve device.

JOSEPH C. McCUNE.